United States Patent
Wong

(10) Patent No.: US 10,691,615 B2
(45) Date of Patent: Jun. 23, 2020

(54) CLIENT-SIDE PERSISTENT CACHING FRAMEWORK

(71) Applicant: SAP SE, Walldorf (DE)

(72) Inventor: Johnson Wong, Vancouver (CA)

(73) Assignee: SAP SE, Walldorf (DE)

(*) Notice: Subject to any disclaimer, the term of this patent is extended or adjusted under 35 U.S.C. 154(b) by 1 day.

(21) Appl. No.: 15/728,918

(22) Filed: Oct. 10, 2017

(65) Prior Publication Data
US 2019/0108139 A1 Apr. 11, 2019

(51) Int. Cl.
*G06F 12/126* (2016.01)
*H04L 29/08* (2006.01)
*G06F 12/0868* (2016.01)

(52) U.S. Cl.
CPC ........ *G06F 12/126* (2013.01); *G06F 12/0868* (2013.01); *H04L 67/2842* (2013.01); *G06F 2212/402* (2013.01)

(58) Field of Classification Search
CPC ............... G06F 12/128; G06F 12/1408; G06F 12/0868; G06F 2212/6046; G06F 2212/1052; G06F 2212/285; G06F 2212/621; G06F 12/126; G06F 2212/402; H04L 67/2842
See application file for complete search history.

(56) References Cited

U.S. PATENT DOCUMENTS

| | | | | |
|---|---|---|---|---|
| 5,636,355 A | * | 6/1997 | Ramakrishnan | G06F 12/0804 711/113 |
| 7,062,675 B1 | * | 6/2006 | Kemeny | G06F 11/1441 711/135 |
| 2006/0179155 A1 | * | 8/2006 | Bunting | H04L 67/06 709/232 |
| 2014/0013025 A1 | * | 1/2014 | Jannyavula Venkata | G06F 12/0246 711/103 |
| 2014/0181532 A1 | * | 6/2014 | Camp | G06F 11/1068 713/190 |
| 2015/0363319 A1 | * | 12/2015 | Qi | G06F 3/0619 711/121 |

* cited by examiner

*Primary Examiner* — Larry T Mackall
(74) *Attorney, Agent, or Firm* — Buckley, Maschoff & Talwalkar LLC

(57) ABSTRACT

A system includes reception of a first request to synchronize content from the persistent memory system to the volatile memory system, and, in response to the first request, retrieval of the content from the persistent memory system and store the content in the volatile memory system. A create, read, update or delete operation is performed on the content stored in the volatile memory system to generate modified content in the volatile memory system, a second request to synchronize content is received from the volatile memory system to the persistent memory system, and, in response to the second request, the modified content is retrieved from the volatile memory system and the modified content is stored in the persistent memory system.

20 Claims, 7 Drawing Sheets

CLIENT-SIDE PERSISTENT CACHING FRAMEWORK

BACKGROUND

Web-based applications are increasingly used by client devices to provide functionality to users. Unlike natively-executing applications, web-based applications often require network round-trips and associated computational processing. Accordingly, it is difficult for such web-based client applications to offer the responsiveness and rich features of natively-executing applications.

Some negative effects of these requirements may be mitigated by caching data on the client device. For example, a web application may maintain a cache in random access memory of the client device, or may maintain a persistent cache in a persistent memory of the client device. In the case of an "in-memory" cache, the cache ceases to exist once the web application is closed, thereby foreclosing many potential advantages of cached client-side data.

A client-side persistent cache also presents obstacles. The content of the cache should remain relevant without consuming excessive memory. Different types of web applications and environments may require different types of caches. Persistent storage is also typically orders of magnitude slower than in-memory storage. Additionally, particularly for enterprise applications, confidential content stored in a persistent cache should remain secure in a case that an unauthorized individual gains access to the client device storing the persistent cache.

DETAILED DESCRIPTION

The following description is provided to enable any person in the art to make and use the described embodiments. Various modifications, however, will remain readily apparent to those in the art.

Generally, some embodiments provide efficient client-side caching, allowing applications to persist content locally for future retrieval while addressing issues posed by persistent caching on client devices. These issues may include, but are not limited to, cache eviction, performance, flexibility and security.

Figure 1:
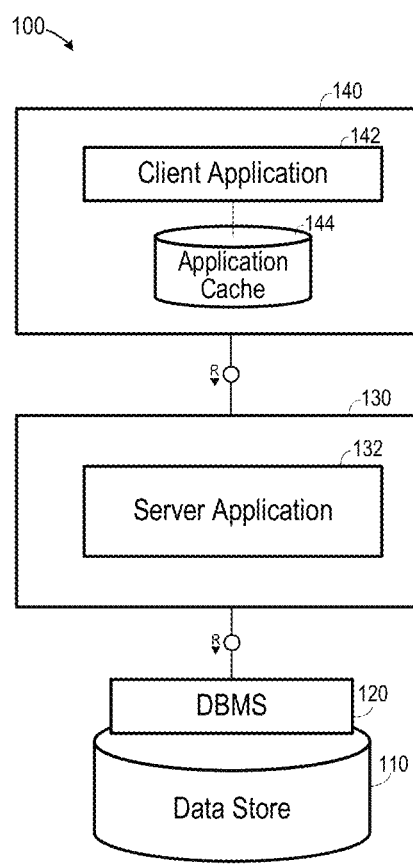
FIG. 1 is a block diagram of a system architecture according to some embodiments.

FIG. 1 is a block diagram of system 100 according to some embodiments. Embodiments are not limited to the FIG. 1 system. System 100 includes data store 110, database management system (DBMS) 120, server 130, and client system 140. Server 130 may simultaneously serve many client systems according to some embodiments.

Server 130 may execute server application 132 to provide data to client system 140 based on data stored in data store 110. Client system 140 may execute client application 142 to display the data and/or to store a portion of the data in application cache 144 as will be described below. For example, server 130 may receive requests from client application 142 executed by client system 140 and provide data visualizations in response. The data visualizations may be provided in a format which may be rendered by client application 142 and also may be stored in application cache 144 for later retrieval.

Embodiments are not limited to caching of data visualizations. According to some embodiments, client system 140 executes client application 142 (e.g., a web application executing within an execution engine of a web browser) to present a user interface to a user on a display of client system 140. The user manipulates the user interface to request data, and client system 140 passes a request based on the manipulation to server 130. Server 130 generates a structured-query language (SQL) script based on the request, and forwards the SQL script to DBMS 120. DBMS 120 executes the SQL script to return a result set to server 130 based on data of data store 110, and application 132 returns the result set to client application 142. Client application 142 may store all or a portion of the result set in application cache 144. The data stored in application cache 144 may comprise any suitable data, including but not limited to transaction data, image data, static web page elements, JavaScript Object Notation files, etc.

Data store 110 may comprise any one or more data sources which are or become known, including but not limited to database views, spreadsheets, relational databases and/or OnLine Analytical Processing cubes. Data store 110 may also comprise any query-responsive data source or sources that are or become known, including but not limited to an SQL relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

System 100 may be located on-premise according to some embodiments. According to other embodiments, server 130, DBMS 120 and data store 110 are located off-site (e.g., in the Cloud) and are accessed via client system 140 over web protocols.

Figure 2:
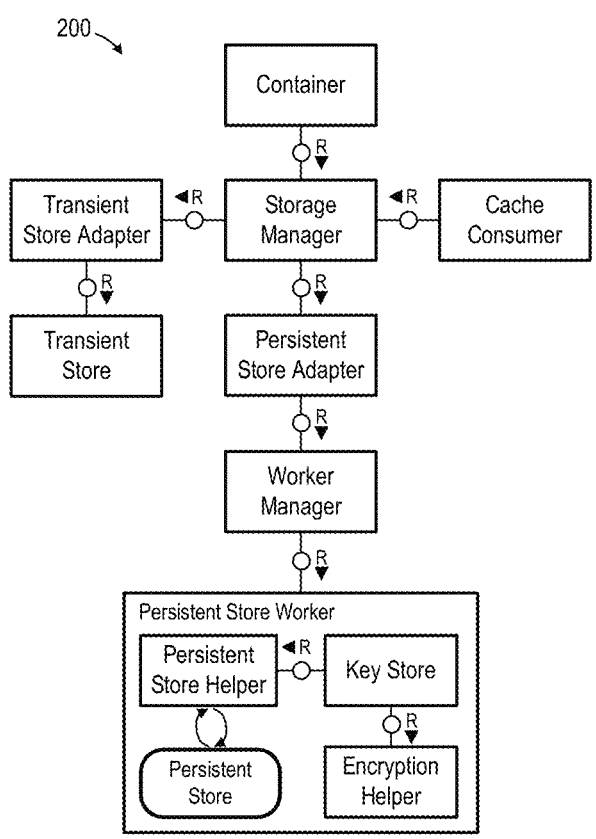
FIG. 2 is a block diagram of a system architecture according to some embodiments.

FIG. 2 is a functional block diagram of architecture 200 according to some embodiments. Architecture 200 may be implemented by client system 140, but embodiments are not limited thereto. In some embodiments, the Container of architecture 200 is the top-level page of client application 142. For example, the Container may comprise a shell which loads first before the sub-components of application 142 load. The Cache Consumer represents functional components of application 142 that directly utilize the persistent cache, which may include the Container itself.

The Storage Manager is an interface for the Container to initialize the cache framework. According to some embodiments, the Storage Manager operates against arbitrary store types using a particular Application Programming Interface (API). In order to enable the use of arbitrary stores, an adapter (e.g., a Transient Store Adapter or a Persistent Store Adapter) is disposed between the concrete implementation of the store and the Storage Manager.

In this regard, the Transient Store comprises a concrete implementation of a cache that resides in-memory (e.g., RAM of client system 140). A Transient Store Adapter is an adapter between a type of Transient Store and the Storage Manager. Similarly, a Persistent Store Adapter is an adapter between the Storage Manager and a type of local persistence.

A Worker Manager spawns worker threads to handle arbitrary pieces of work and manages the lifecycle of the worker threads. The Worker Manager is a centralized service for worker thread activities and helps to control application impact on client system resources, remove maintenance of multiple worker manager implementations, and de-couple worker logic from worker management logic. A Persistent Store Worker is a worker thread for interacting with persistent storage. The Persistent Store Worker may also perform other computationally-intensive tasks such as data encryption/decryption.

The Persistent Store may correspond to application cache 144, as a concrete implementation of a cache that resides in persistent storage (e.g., fixed disk). The Persistent Store Helper resides in the Persistent Store Worker worker thread for interacting with the Persistent Store.

The Key Store manages keys used for encryption, and may utilize the Persistent Store Helper for key storage and retrieval. Additionally, the Encryption Helper may provide encryption-specific logic (e.g., algorithms and parameters).

According to some embodiments, Create, Read, Update and Delete (CRUD) operations on cached data do not operate directly against data stored in the local Persistent Store. Instead, the Transient Store is used to capture data to be operated upon. The data may be written back to the Persistent Store when there is minimal activity on the main thread, or when performance is less critical. Similarly, synchronization may be performed between the Persistent Store and the Transient Store soon after container load to minimize contention on the main thread.

Figure 3:
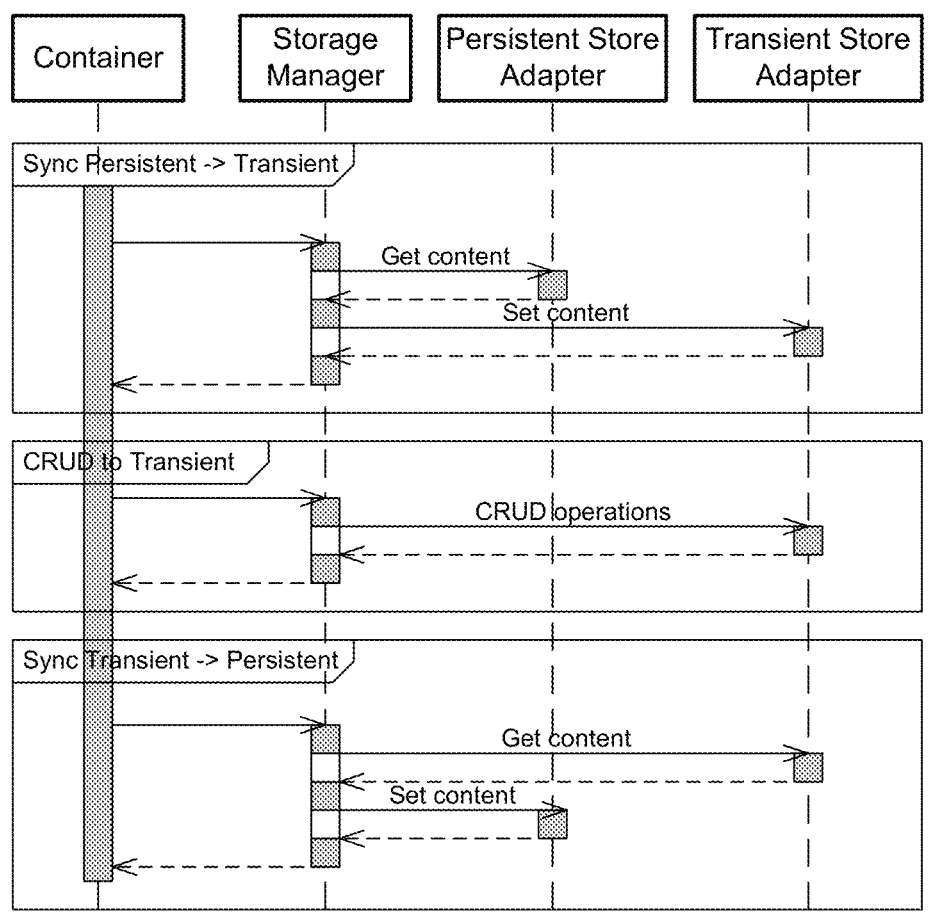
FIG. 3 is a sequence diagram of store synchronization according to some embodiments.

FIG. 3 illustrates synchronization workflows and usage of the Transient Store for CRUD operations during execution of the client application. For simplicity, the Transient Store and Persistent Store implementations behind their respective Adapters are not shown.

As shown, the application Container utilizes the Storage Manager to manage synchronization of content from the Persistent Store to the Transient Store. The synchronization consists of an operation to get content from the Persistent Store via its associated Persistent Store Adapter and to then set the content to the Transient Store via its associated Transient Store Adapter. Thereafter, the Container utilizes to Storage Manager to perform CRUD operations on the content of the Transient Store, again via its associated Transient Store Adapter. When it is determined to persist the data of the Transient Store (e.g., at a point of minimal activity on the main thread), the Container initiates the Storage Manager to get content from the Transient Store and to set the content in the Persistent Store. Similarly, the aforementioned synchronization of content from the Persistent Store to the Transient Store may also be performed at any time deemed suitable ((e.g., at a point of minimal activity on the main thread).

According to some embodiments, a common API is implemented by Store Adapters and used by the Storage Manager to enable the workflow of FIG. 3. The API may be Promise-driven, due to the asynchronous nature of operating with persistent storage. In this regard, a Promise is a proxy for a value which is not necessarily known when the Promise is created. A Promise allows handlers to be associated with an asynchronous action's eventual success value or failure reason. Instead of immediately returning a final value as in the case of a synchronous method, the asynchronous method returns a "promise" to supply the value at some point in the future.

An API according to some embodiments may include the following methods:

getAll: A method to get all entries in the Store, which returns a Promise resolving to a map of (key, value) pairs.

setAll: A method to set a map of (key, value) pairs into the Store, which returns a Promise resolving to an array of keys that are successfully set.

get: A method to get a value corresponding to supplied key if it exists, which returns a Promise resolving to value corresponding to key if it exists.

set: A method to set a given (key, value) pair into the Store, updating the value if it already exists. The method returns a Promise resolving to the key of the set value if the add or update is successful.

prune: A method to prune entries from the Store given cache expiry policies defined in the Store instance, which returns a Promise resolving to keys of the pruned entries that are pruned.

Regarding pruning, client application 142 is typically run in a Web browser or browser-like environment and therefore a daemon or chron job for periodically pruning the local persisted cache is not suitable. Even if such a mechanism were suitable, it would not sufficiently constrain the cache size below a specified limit. Accordingly, some embodiments of client application 142 enforce cache eviction policies on locally-stored application cache 144.

Client application 142 can perform cache eviction only while it is running. However, performing cache eviction at random points of application execution may be inefficient and may lead to contention with the rest of the application logic. Therefore, according to some embodiments, cache eviction is performed during synchronization of content from the Persistent Store to the Transient Store, and during synchronization of content from the Transient Store to the Persistent Store. Advantageously for cache eviction purposes, both types of synchronization result in reading through each entry, or at least through some metadata of each entry.

Figure 4:
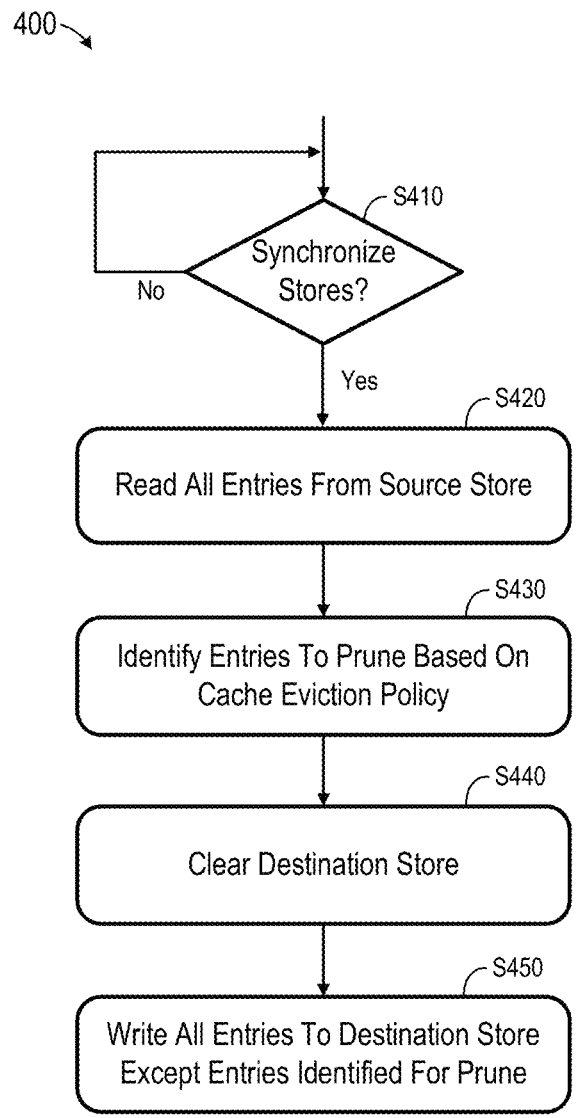
FIG. 4 is a flow diagram of a process according to some embodiments.

FIG. 4 comprises a flow diagram of process 400 to prune entries based on a cache eviction policy according to some embodiments. In some embodiments, various hardware elements of system 100 execute program code to perform process 400. Process 400 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Flow cycles at S410 until it is determined to synchronize the transient and persistent stores. As mentioned above, such synchronization may occur at application start-up and/or during main thread downtime. The synchronization may comprise synchronization from a source (e.g. persistent or transient) store to a destination (e.g. transient or persistent) store.

At S420, all entries are read from the source store. As illustrated with respect to FIG. 3, Storage Manager may call an API of an adapter associated with the source store to read all entries from the source store at S420. Next, at S430, entries to be pruned are determined based on a cache eviction policy.

According to some embodiments, a cache eviction strategy may identify entries to prune based on several criteria. For example, S430 may comprise evaluating Max Age, Max Entries, and Max Size criteria. Max Age may correspond to a last modified time of the entry. The Max Age may be evaluated first to identify all entries that are deemed too old to be maintained in the persistent store. To evaluate the Max Entries criterion, the remaining entries (i.e., those entries not identified by the Max Age evaluation) are ordered by last access time. Entries at the end of the ordered list are identified for pruning such that the number of thusly-remaining entries is less than or equal to the specified Max Entries. Beginning with the oldest last access time, each of the thusly-remaining entries is then identified for pruning until the size of all entries, in aggregate, is less than or equal to a specified Max Size.

After the entries to be pruned have been identified, the destination store is cleared at S440. In a case that the destination store is the transient store and the synchronization occurs at application start-up, the transient store will be cleared and no action is needed at S440. Next, at S450, all of the entries read at S420 are written to the destination store, except for those entries which were identified at S430. In an alternative embodiment, S450 may comprise deleting the entries identified at S430 from the source store and then synchronizing the source store to the destination store.

To facilitate efficient retrieval and reading of data for cache eviction, the Persistent Store may be indexed by cache eviction criteria (e.g., last accessed time, last modified time, and entry size). The indexing functionality may be provided by the concrete implementation of the Persistent Store or by leveraging native store implementations which provide indexing functionality, such as IndexedDB.

Since cache eviction as described herein occurs while the client application is running, it is possible for stale content to consume memory space on a client system after the client application is closed. According to some embodiments, the persistent storage may be classified as temporary by the developer of architecture 200 or of client application 142. Under this classification, the cache may be pruned by the browser or operating system outside the context of the application.

The above examples include a single persistent store and single transient store. According to some embodiments, a client application may be associated with multiple stores, including multiple types of both persistent and transient stores. For example, a complex client application may require a significant amount of cached content which is logically disparate, in that not all the content needs to be loaded and saved at the same time. The use of multiple stores in this scenario provides a finer level of granularity over the operations performed on cached content.

Figure 5:
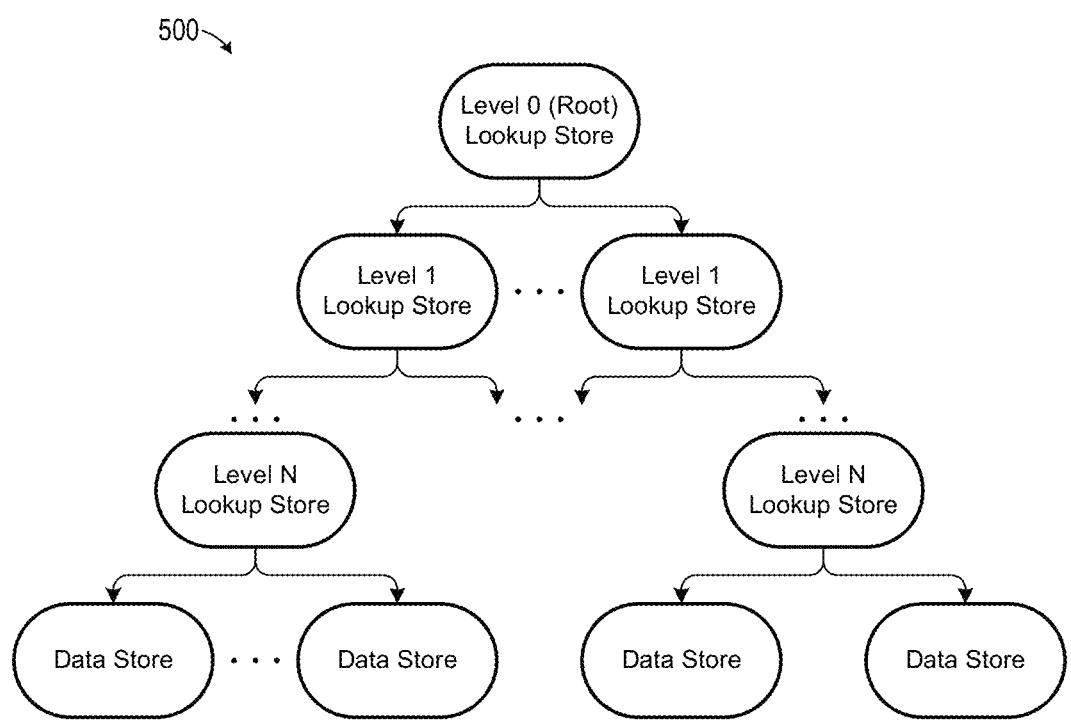
FIG. 5 is a diagram illustrating a hierarchy of look-up stores according to some embodiments.

The use of multiple stores may require additional cache eviction logic. This logic may be encapsulated behind the Storage Manager, rather than within the client application. FIG. 5 illustrates a hierarchy of look-up stores that store aggregated metadata of their child stores, within one entry per child. For example, the last accessed time for a lookup store entry should equal the most recent last accessed time of any entry in all the data stores corresponding (i.e., which are children of) to the lookup store. Similarly, the total size denoted by an entry in a lookup store should equal the aggregate size of all entries in all stores corresponding to the entry in the lookup store. This logic is then recursively applied up to the root lookup store. Eviction determinations can then be performed on lower levels of the hierarchy for finer-grained control, or on higher levels for coarser-grained control.

To address security of the Persistent Store, reads and writes from and to the Persistent Store may be secured by encryption. Encryption imposes both computational and implementation overhead so some embodiments allow consuming client applications to specify whether encryption should be active, as well as any encryption parameters.

The Persistent Store Worker worker thread may provide encryption (of writes) and decryption (of reads). As shown in architecture 200, symmetric or asymmetric encryption keys may be stored client-side (e.g., using an indexed database) in a Key Store separate from the Persistent Store. Key storage can utilize the above-described cache data storage mechanisms and the same cache indexing and eviction strategies.

Regarding the security of the keys themselves, keys may be kept opaque by using, for example, native cryptography frameworks such as Web Crypto and storage solutions such as IndexedDB. Consequently, raw representation of keys are never exposed to either the client application nor to the user of the client system. Such keys also cannot be exported and may only be used indirectly by the application through the cryptography library API. Alternatively, keys may be stored on a secure server, which removes them from the client system where the encrypted data is stored, but at the cost of opacity.

In some embodiments, keys expire after a short amount of time configurable by the consumer of the cache framework. This arrangement implicitly couples keys with data in that a data entry should be considered expired if no stored key is available to decrypt it. In some embodiments, one key per user account is maintained by a client application. A key expires after a specified number of days, after which a new key is generated. Data encrypted with the old key cannot be decrypted by the new key and will therefore be discarded.

Figure 6:
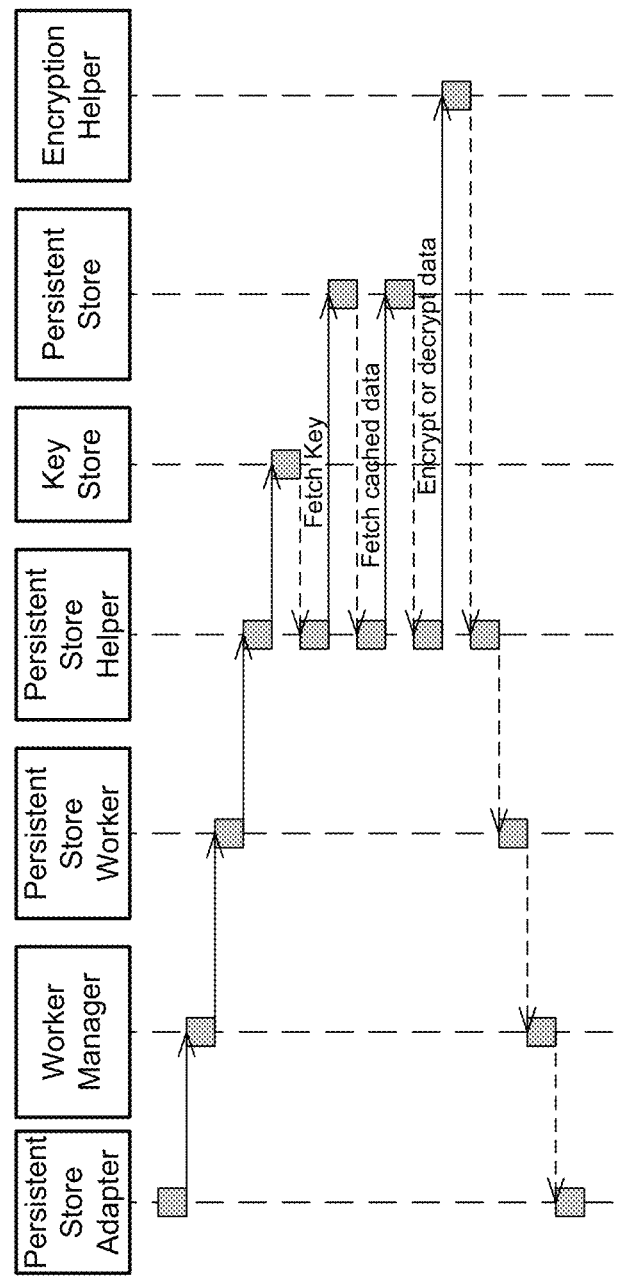
FIG. 6 is a sequence diagram illustrating secure operation according to some embodiments.

FIG. 6 is a sequence diagram illustrating how a Persistent Store might utilize a Key Store and Encryption Helper to support data encryption. In the example, the Key Store utilizes the Persistent Store Helper to persist and retrieve encryption keys.

Some embodiments may provide additional framework plugins. For example, the Persistent Store Helper may interact with a Compression Helper to compress data before storage in the Persistent Store, to reduce the amount of data stored in the Persistent Store. In some embodiments, a Compression Helper is used to compress the data before encryption, and to decompress the data after decryption. Compression prior to encryption may reduce the amount of data to be encrypted.

Figure 7:
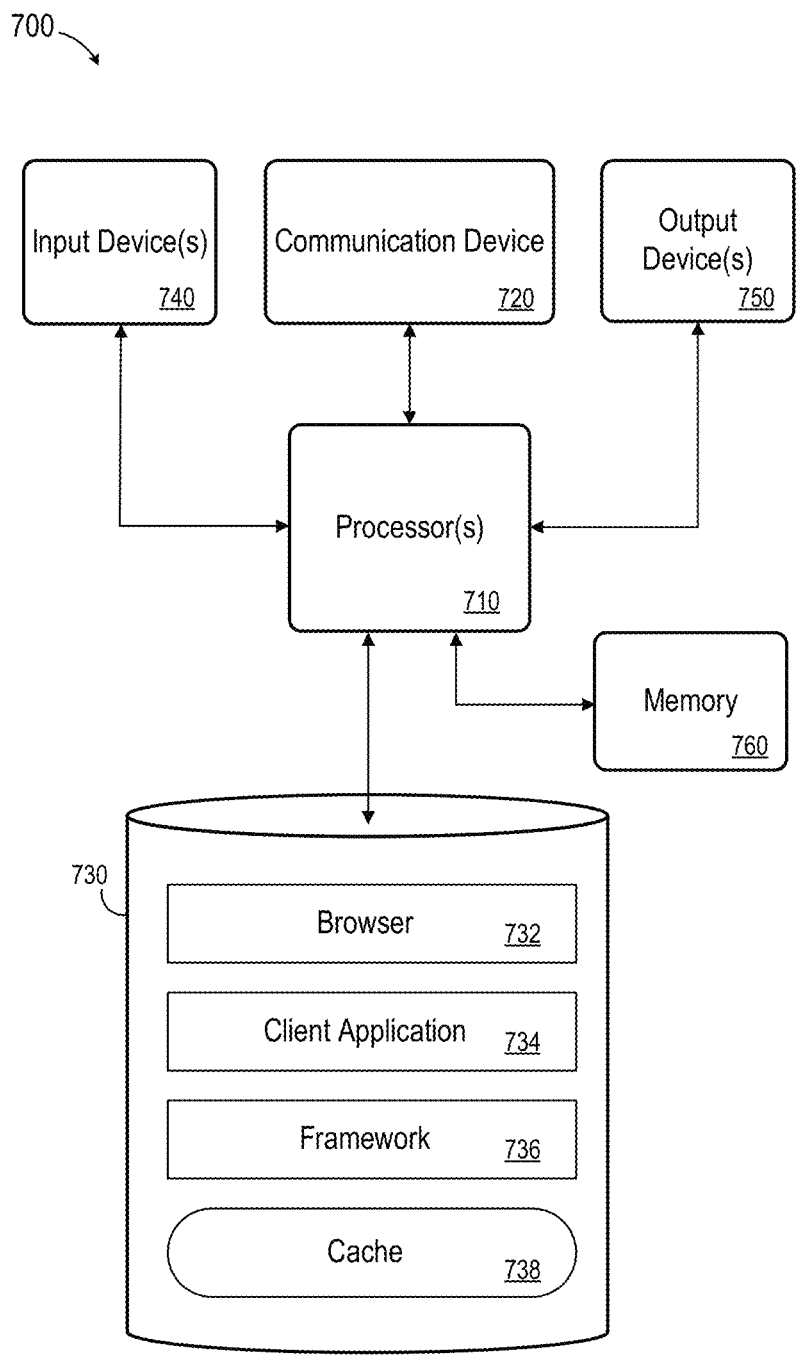
FIG. 7 is a block diagram of an apparatus according to some embodiments.

FIG. 7 is a block diagram of apparatus 700 according to some embodiments. Apparatus 700 may comprise a general-purpose computing apparatus and may execute program code to perform any of the functions described herein. Apparatus 700 may comprise an implementation of client system 140 as described above. Apparatus 700 may include other unshown elements according to some embodiments.

Apparatus 700 includes processor(s) 710 operatively coupled to communication device 720, data storage device 730, one or more input devices 740, one or more output devices 750 and memory 760. Communication device 720 may facilitate communication with external devices, such as a reporting client, or a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM), Storage Class Memory (SCM) or any other fast-access memory.

Browser 732 may comprise program code to provide an execution engine, while client application 734 may comprise program code executed by processor 710 (and within the execution engine) to cause apparatus 700 to perform any one or more of the processes described herein. To perform such processes, client application 734 may utilize framework 736, which may in turn implement elements of architecture 200. Embodiments are not limited to execution of these processes by a single apparatus.

Cache 738 may comprise a persistent store as described herein. Client application 734 may operate, in conjunction with framework 736, to store data in cache 738, to synchronize cache 738 with a transient store of memory 760, and to evict data from cache 738 as described herein. Data storage device 730 may also store data and other program code for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a volatile memory system;
   a persistent memory system; and
   a processor to execute processor-executable process steps of a client application to:
      identify one or more entries for eviction by evaluating: first a max age criteria, second a max entries criteria and third a max size criteria;
      receive a first request to synchronize content from the persistent memory system to the volatile memory system, wherein the content for synchronization is all entries in the persistent memory system less any entries identified for eviction; and
      in response to the first request:
         retrieve the content from the persistent memory system; and
         store the content in the volatile memory system;
      perform a create, read, update or delete operation on the content stored in the volatile memory system to generate modified content in the volatile memory system;
      receive a second request to synchronize content from the volatile memory system to the persistent memory system; and
      in response to the second request:
         retrieve the modified content from the volatile memory system; and
         store the modified content in the persistent memory system.

2. A system according to claim 1, wherein retrieval of the content from the persistent memory system comprises request of the content from a persistent store adapter associated with the persistent memory system, and
   wherein storage of the content in the volatile memory system comprises transmitting a request to store the content to a transient store adapter associated with the volatile memory system.

3. A system according to claim 2, wherein storage of the content in the volatile memory system comprises identification of entries of the content to prune based on a cache eviction policy.

4. A system according to claim 3, wherein retrieval of the content from the persistent memory system comprises:
   retrieval of a key from the persistent memory system; and
   decryption of the content using the key, and
   wherein storage of the modified content in the persistent memory system comprises:
   encryption of the modified content using the key; and
   storage of the encrypted modified content in the persistent memory system.

5. A system according to claim 1, wherein storage of the content in the volatile memory system comprises identification of entries of the content based on a cache eviction policy.

6. A system according to claim 5, wherein storage of the content in the volatile memory system is based on the identified entries of the content.

7. A system according to claim 1, wherein storage of the modified content in the persistent memory system comprises identification of entries of the modified content based on a cache eviction policy.

8. A system according to claim 1, wherein retrieval of the content from the persistent memory system comprises:
retrieval of a key from the persistent memory system; and decryption of the content using the key, and
wherein storage of the modified content in the persistent memory system comprises:
encryption of the modified content using the key; and
storage of the encrypted modified content in the persistent memory system.

9. A method for a client application executing on a client device, the method comprising:
receiving content from a remote server application;
storing the content in a persistent memory system of the client device;
identifying one or more entries for eviction, by evaluating: first a max age criteria, second a max entries criteria and third a max size criteria;
synchronizing the content from the persistent memory system to a volatile memory system of the client device in response to a synchronization request, wherein the content for synchronization is all entries in the persistent memory system less any entries identified for eviction;
performing a create, read, update or delete operation on the content stored in the volatile memory system to generate modified content in the volatile memory system; and
synchronizing the modified content from the volatile memory system to the persistent memory system.

10. A method according to claim 9, wherein synchronizing the content from the persistent memory system comprises requesting the content from a persistent store adapter associated with the persistent memory system, and transmitting a request to store the content to a transient store adapter associated with the volatile memory system.

11. A method according to claim 10, wherein synchronizing the content from the persistent memory system to the volatile memory system comprises identifying entries of the content to prune based on a cache eviction policy.

12. A method according to claim 11, wherein synchronizing the content from the persistent memory system to the volatile memory system comprises:
retrieving a key from the persistent memory system; and decrypting the content using the key, and
wherein synchronizing the modified content from the volatile memory system to the persistent memory system comprises:
encrypting the modified content using the key; and
storing the encrypted modified content in the persistent memory system.

13. A method according to claim 9, wherein synchronizing the content from the persistent memory system to the volatile memory system comprises identifying entries of the content to prune based on a cache eviction policy.

14. A method according to claim 9, wherein synchronizing the modified content from the volatile memory system to the persistent memory system comprises identifying entries of the modified content based on a cache eviction policy.

15. A method according to claim 9, wherein synchronizing the content from the persistent memory system to the volatile memory system comprises:
retrieving a key from the persistent memory system; and decrypting the content using the key, and
wherein synchronizing the modified content from the volatile memory system to the persistent memory system comprises:
encrypting the modified content using the key; and
storing the encrypted modified content in the persistent memory system.

16. A non-transitory computer-readable medium storing computer-executable process steps which, when executed by a computing device, provide:
a storage manager to:
identify one or more entries for eviction by evaluating: first a max age criteria, second a max entries criteria and third a max size criteria;
receive a first request from a client application to synchronize content from a persistent memory system of the computing device to a volatile memory system of the computing device, wherein the content for synchronization is all entries in the persistent memory system less any entries identified for eviction; and
in response to the first request:
retrieve the content from the persistent memory system; and
store the content in the volatile memory system;
receive a second request from a client application to perform a create, read, update or delete operation on the content stored in the volatile memory system;
in response to the second request, perform the create, read, update or delete operation on the content stored in the volatile memory system to generate modified content in the volatile memory system;
receive a third request from the client application to synchronize content from the volatile memory system to the persistent memory system; and
in response to the third request,
retrieve the modified content from the volatile memory system; and
store the modified content in the persistent memory system.

17. A medium according to claim 16, the computer-executable process steps, when executed by a computing device, to further provide:
a persistent store adapter associated with the persistent memory system, wherein retrieval of the content from the persistent memory system comprises request of the content from the persistent store adapter and receipt of the content from the persistent store adapter; and
a transient store adapter associated with the volatile memory system, wherein storage of the content in the volatile memory system comprises transmission of a request to store the content to the transient store adapter.

18. A medium according to claim 17, wherein storage of the content in the volatile memory system comprises identification of entries of the content to prune based on a cache eviction policy.

19. A medium according to claim 16, wherein retrieval of the content from the persistent memory system comprises:
retrieval of a key from the persistent memory system; and decryption of the content using the key, and
wherein storage of the modified content in the persistent memory system comprises:
encryption of the modified content using the key; and storage of the encrypted modified content in the persistent memory system.

20. A medium according to claim 16, wherein storage of the content in the volatile memory system comprises identification of entries of the content based on a cache eviction policy.

\* \* \* \* \*